United States Patent
Lim et al.

(10) Patent No.: US 8,930,602 B2
(45) Date of Patent: Jan. 6, 2015

(54) PROVIDING ADAPTIVE BANDWIDTH ALLOCATION FOR A FIXED PRIORITY ARBITER

(75) Inventors: Kie Woon Lim, Simpang Ampat (MY); E-Liang Chew, Georgetown (MY); Khee Wooi Lee, Bayan Lepas (MY); Darren L. Abramson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 13/222,354

(22) Filed: Aug. 31, 2011

(65) Prior Publication Data

US 2013/0054856 A1 Feb. 28, 2013

(51) Int. Cl.
| G06F 12/00 | (2006.01) |
| G06F 13/14 | (2006.01) |
| G06F 13/38 | (2006.01) |
| G06F 13/00 | (2006.01) |
| G06F 13/36 | (2006.01) |
| G06F 13/362 | (2006.01) |

(52) U.S. Cl.
CPC ..................................... *G06F 13/14* (2013.01)
USPC ........... 710/244; 710/107; 710/113; 710/114; 710/240; 710/241

(58) Field of Classification Search
USPC ........... 710/29, 107, 111, 113–115, 240–241, 710/244
See application file for complete search history.

(56) References Cited

U.S. PATENT DOCUMENTS

| 5,493,566 A | 2/1996 | Ljungerg et al. |
| 6,009,488 A | 12/1999 | Kavipurapu |
| 6,233,632 B1 | 5/2001 | Meiyappan et al. |
| 6,330,647 B1 * | 12/2001 | Jeddeloh et al. ............... 711/158 |
| 6,427,169 B1 | 7/2002 | Elzur |
| 6,469,982 B1 * | 10/2002 | Henrion et al. ............... 370/230 |
| 6,611,893 B1 | 8/2003 | Lee et al. |
| 6,694,380 B1 | 2/2004 | Wolrich et al. |
| 6,725,313 B1 | 4/2004 | Wingard et al. |
| 6,810,460 B1 | 10/2004 | Kirkwood |
| 6,816,938 B2 | 11/2004 | Edara et al. |
| 7,065,733 B2 | 6/2006 | Goodnow et al. |
| 7,457,905 B2 | 11/2008 | Gehman |
| 7,506,089 B2 | 3/2009 | Cho et al. |

(Continued)

FOREIGN PATENT DOCUMENTS

| KR | 10-2005-0077437 | 8/2005 |
| KR | 10-2005-0082834 | 8/2005 |
| WO | 2005071553 | 8/2005 |

OTHER PUBLICATIONS

Intel Corporation, "An Introduction to the Intel QuickPath Interconnect," Jan. 2009, pp. 1-22.

(Continued)

*Primary Examiner* — Thomas J Cleary
(74) *Attorney, Agent, or Firm* — Trop, Pruner & Hu, P.C.

(57) ABSTRACT

In one embodiment, the present invention includes a method for receiving requests from requestors in an arbiter, detecting that none of the requestors have a qualified request for at least one cycle of an arbitration round, and preventing a grant count reload of grant counters associated with the when at least one of the requestors has available grants for the arbitration round. Other embodiments are described and claimed.

17 Claims, 8 Drawing Sheets

(56) References Cited

U.S. PATENT DOCUMENTS

| | | |
|---|---|---|
| 7,573,295 B1 | 8/2009 | Stadler |
| 7,673,087 B1 | 3/2010 | Ansari et al. |
| 7,685,346 B2 | 3/2010 | Teh et al. |
| 7,723,902 B2 | 5/2010 | Mandhani et al. |
| 7,734,856 B2 | 6/2010 | Reinig et al. |
| 7,783,819 B2 | 8/2010 | Mandhani |
| 7,793,345 B2 | 9/2010 | Weber et al. |
| 7,873,068 B2 | 1/2011 | Klinglesmith et al. |
| 7,979,592 B1 | 7/2011 | Pettey et al. |
| 7,990,999 B2 | 8/2011 | Lee et al. |
| 8,010,731 B2 | 8/2011 | Mandhani |
| 8,023,508 B2 | 9/2011 | Horton |
| 8,199,157 B2 | 6/2012 | Park et al. |
| 8,225,019 B2 | 7/2012 | Asnaashari |
| 8,286,014 B2 | 10/2012 | Han et al. |
| 8,364,874 B1 | 1/2013 | Schlansker et al. |
| 8,437,369 B2 | 5/2013 | Shaikli |
| 8,443,422 B2 | 5/2013 | Weber et al. |
| 2002/0038401 A1 | 3/2002 | Zaidi |
| 2003/0088722 A1 | 5/2003 | Price |
| 2003/0126336 A1 | 7/2003 | Creta |
| 2004/0177176 A1 | 9/2004 | Li et al. |
| 2005/0010687 A1 | 1/2005 | Dai |
| 2005/0120323 A1 | 6/2005 | Goodnow et al. |
| 2005/0137966 A1 | 6/2005 | Munguia et al. |
| 2005/0177664 A1 | 8/2005 | Cho et al. |
| 2005/0289369 A1 | 12/2005 | Chung et al. |
| 2005/0289374 A1 | 12/2005 | Kim et al. |
| 2006/0047849 A1 | 3/2006 | Mukherjee |
| 2006/0101179 A1* | 5/2006 | Lee et al. .................... 710/113 |
| 2006/0140126 A1 | 6/2006 | Zhong |
| 2006/0218336 A1 | 9/2006 | Ishizawa et al. |
| 2007/0006108 A1 | 1/2007 | Bueti |
| 2007/0067549 A1 | 3/2007 | Gehman |
| 2008/0059441 A1 | 3/2008 | Gaug et al. |
| 2008/0082840 A1 | 4/2008 | Kendall et al. |
| 2008/0147858 A1 | 6/2008 | Prakash et al. |
| 2008/0163005 A1 | 7/2008 | Sonksen et al. |
| 2008/0235415 A1 | 9/2008 | Clark et al. |
| 2008/0288689 A1 | 11/2008 | Hoang et al. |
| 2008/0310458 A1 | 12/2008 | Rijpkema |
| 2009/0006165 A1* | 1/2009 | Teh et al. ...................... 705/8 |
| 2009/0119432 A1 | 5/2009 | Lee et al. |
| 2009/0235099 A1 | 9/2009 | Branover et al. |
| 2009/0249098 A1 | 10/2009 | Han et al. |
| 2009/0296740 A1 | 12/2009 | Wagh |
| 2010/0199010 A1 | 8/2010 | Goren et al. |
| 2010/0262855 A1 | 10/2010 | Buch et al. |
| 2010/0278195 A1 | 11/2010 | Wagh |
| 2010/0293304 A1* | 11/2010 | Alexandron et al. .......... 710/25 |
| 2011/0047272 A1 | 2/2011 | Bosneag |
| 2011/0078315 A1 | 3/2011 | Matsushita et al. |
| 2011/0078356 A1 | 3/2011 | Shoemaker |
| 2011/0093576 A1 | 4/2011 | Cherian et al. |
| 2011/0179248 A1 | 7/2011 | Lee |
| 2012/0066468 A1 | 3/2012 | Nakajima et al. |
| 2012/0079590 A1 | 3/2012 | Sastry et al. |
| 2012/0233514 A1 | 9/2012 | Patil et al. |
| 2012/0311213 A1 | 12/2012 | Bender et al. |
| 2013/0054845 A1 | 2/2013 | Nimmala et al. |

OTHER PUBLICATIONS

Sousek, et al., "PCI Express Core Integration with the OCP Bus," CAST, Inc. 2006, 15 pages.

Mentor Graphics, "PCI Express to AMBA 3 AXI Bridge IP," Mentor Graphics, Jun. 2007, 2 pages.

Everton Carara, et al., "Communication Models in Networks-on-Chip," 18th IEEE/IFIP International Workshop on Rapid System Prototyping (RSP '07), 2007, pp. 57-60.

U.S. Appl. No. 13/248,234, filed Sep. 29, 2011, entitled, "Sending Packets With Expanded Headers", by Sridhar Lakshmanamurthy, et al.

U.S. Appl. No. 13/248,243, filed Sep. 29, 2011, entitled, "Aggregating Completion Messages in a Sideband Interface", by Sridhar Lakshmanamurthy, et al.

U.S. Appl. No. 13/248,252, filed Sep. 29, 2011, entitled, "Providing Error Handling Support to Legacy Devices", by Sridhar Lakshmanamurthy, et al.

U.S. Appl. No. 13/248,263, filed Sep. 29, 2011, entitled, "Providing Multiple Decode Options for a System-On-Chip (SoC) Fabric", by Sridhar Lakshmanamurthy, et al.

U.S. Appl. No. 13/248,270, filed Sep. 29, 2011, entitled, "Supporting Multiple Channels of a Single Interface", by Sridhar Lakshmanamurthy, et al.

U.S. Appl. No. 13/248,276, filed Sep. 29, 2011, entitled, "Issuing Requests to a Fabric", by Sridhar Lakshmanamurthy, et al.

U.S. Appl. No. 13/222,362, filed Aug. 31, 2011, entitled, "Integrating Intellectual Property (IP) Blocks Into a Processor", by Prashanth Nimmala, et al.

U.S. Appl. No. 13/306,244, filed Nov. 29, 2011, entitled, "Providing a Sideband Message Interface for System on a Chip (SoC)", by Robert P. Adler, et al.

U.S. Appl. No. 13/248,232, filed Sep. 29, 2011, entitled, "Common Idle State, Active State and Credit Management for an Interface", by Sridhar Lakshmanamurthy, et al.

International Searching Authority, "Notification of Transmittal of the International Search Report and the Written Opinion of the International Searching Authority," mailed Feb. 1, 2013, in International application No. PCT/US2012/051018.

U.S. Patent and Trademark Office, Office Action mailed Jun. 7, 2013 with Reply filed Sep. 3, 2013, in U.S. Appl. No. 13/248,232.

U.S. Patent and Trademark Office, Office Action mailed Jun. 20, 2013 with Reply filed Sep. 18, 2013, in U.S. Appl. No. 13/248,243.

U.S. Patent and Trademark Office, Office Action mailed Apr. 23, 2013 with Reply filed Jul. 22, 2013, in U.S. Appl. No. 13/248,263.

U.S. Patent and Trademark Office, Office Action mailed Jun. 14, 2013 with Reply filed Sep. 9, 2013, in U.S. Appl. No. 13/248,270.

U.S. Patent and Trademark Office, Office Action mailed Jun. 20, 2013 with Reply filed Sep. 17, 2013, in U.S. Appl. No. 13/248,276.

U.S. Patent and Trademark Office, Office Action mailed Sep. 18, 2013, in U.S. Appl. No. 13/248,252.

* cited by examiner

PROVIDING ADAPTIVE BANDWIDTH ALLOCATION FOR A FIXED PRIORITY ARBITER

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultramobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device.

One such area of design interest is arbitration. To prevent deadlocks and stalls in a system, an arbiter may be present to receive requests from multiple agents and arbitrate the requests to provide access grants to resources of the system. In some systems, arbitration is performed according to a fixed priority privilege in which a certain number of grants are allowed to avoid a higher priority requestor from starving lower priority requestors. Grant operation typically starts from the highest priority requestor and proceeds to the lowest priority requestor. In some systems, the lower priority requestor can only receive a grant when higher priority requestors have no active requests or have exhausted their grant count. Requestors commonly receive reloaded grant counts when no active requests are present, every requestor participating in arbitration has exhausted their grant counts, or no active request from any requestor with a valid grant count exists.

In a conventional fixed priority arbitration scheme, bandwidth allocation may not be able to be maintained for non-pipelined requests. These requests are received in the arbiter from a requestor that cannot, for some reason, maintain back-to-back requests. As a result, in a platform having pipelined and non-pipelined input/output (I/O) requestors, non-pipelined requestors can realize significant bandwidth degradation.

DETAILED DESCRIPTION

In various embodiments, an adaptive bandwidth allocation enhancement may be provided for a fixed priority arbiter to enhance fairness to requestors seeking access to an arbitrated resource. As will be discussed further below, a level of hysteresis can be provided to control when grant counts associated with the requestors can be reloaded.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor that includes various homogeneous and/or heterogeneous processing agents, and additional components such as networking components, e.g., routers, controllers, bridge devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within an SoC or other chip. Such IP blocks can be of varying types, including general-purpose processors such as in-order or out-of-order cores, fixed function units, graphics processors, controllers, among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Figure 1:
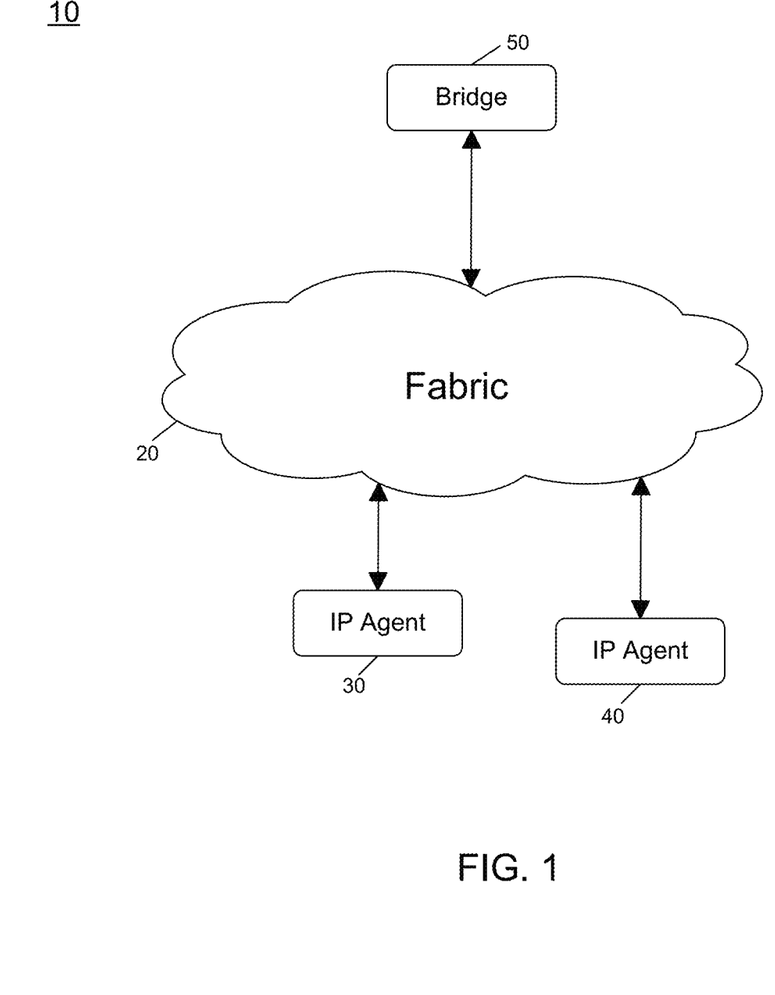
FIG. 1 is a block diagram of a basic interconnect architecture in accordance with an embodiment of the present invention.

Referring now to FIG. 1, shown is a block diagram of a basic interconnect architecture in accordance with an embodiment of the present invention. As shown in FIG. 1, system 10 may be a portion of a system-on-chip or other semiconductor device and includes a fabric 20 that acts as an interconnect between various components. In the implementation shown, these components include IP agents 30 and 40, which can be independent IP blocks to provide various functionality such as compute capabilities, graphics capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability or design for test (DFx) interface. According to the IOSF specification, an agent may support any combination of these interfaces. Specifically, an agent can support 0-N primary interfaces, 0-N sideband message interfaces, and an optional DFx interface. However, according to the specification, an agent must support at least one of these 3 interfaces.

Figure 2:
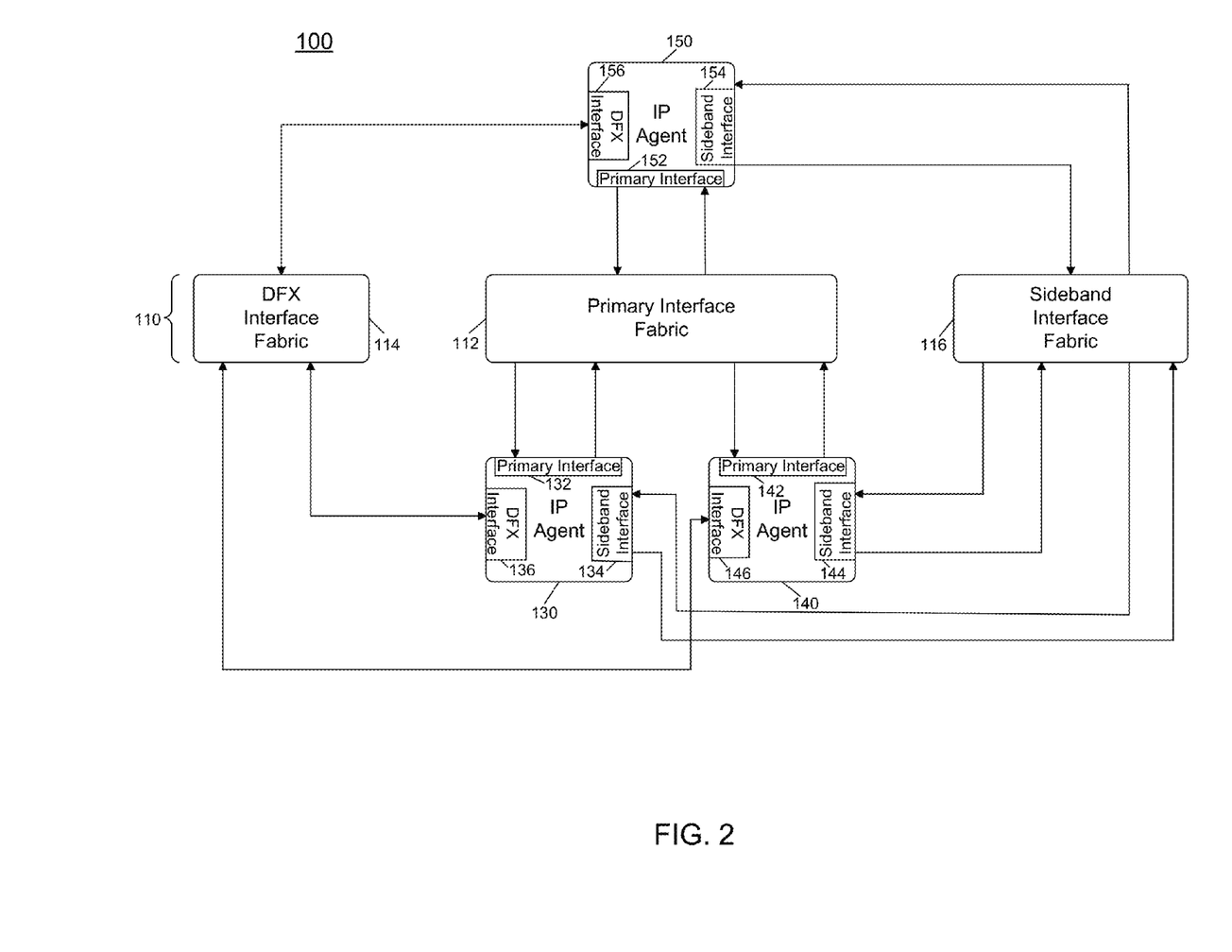
FIG. 2 is a block diagram of further details of an interconnect architecture in accordance with an embodiment of the present invention.

Fabric 20 may be a hardware element that moves data between different agents. Note that the topology of fabric 20 can be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, a fabric 110 includes various interfaces, including a primary interface 112, a DFx interface 114, and a sideband interface 116. Primary interface 112 can be used for in-band communication, e.g., between a host processor such as a central processing unit (CPU) or other processor and an agent. Primary interface 112 may further enable communication of peer transactions between agents and supported fabrics. All transaction types including memory, input output (IO), configuration, and in-band messaging can be delivered via primary interface 112. Thus the primary interface may act as a high performance interface for data transferred between peers and/or communications with upstream components.

In various implementations, primary interface 112 implements a split transaction protocol to achieve maximum concurrency. That is, this protocol provides for a request phase, a grant phase, and a command and data phase. Primary interface 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface 112 supports the concept of distinct channels to provide a mechanism for independent data flows throughout the system. As will be described further, primary interface 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface 112 may support PCI ordering rules and enumeration.

In turn, sideband interface 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, configuration shadowing, test modes and so forth, a sideband interface 116 according to the IOSF specification standardizes all out-of-band communication, promoting modularity and reducing validation requirements for IP reuse across different designs. In general, sideband interface 116 may be used to communicate low performance information, rather than for primary data transfers, which typically may be communicated via primary interface 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
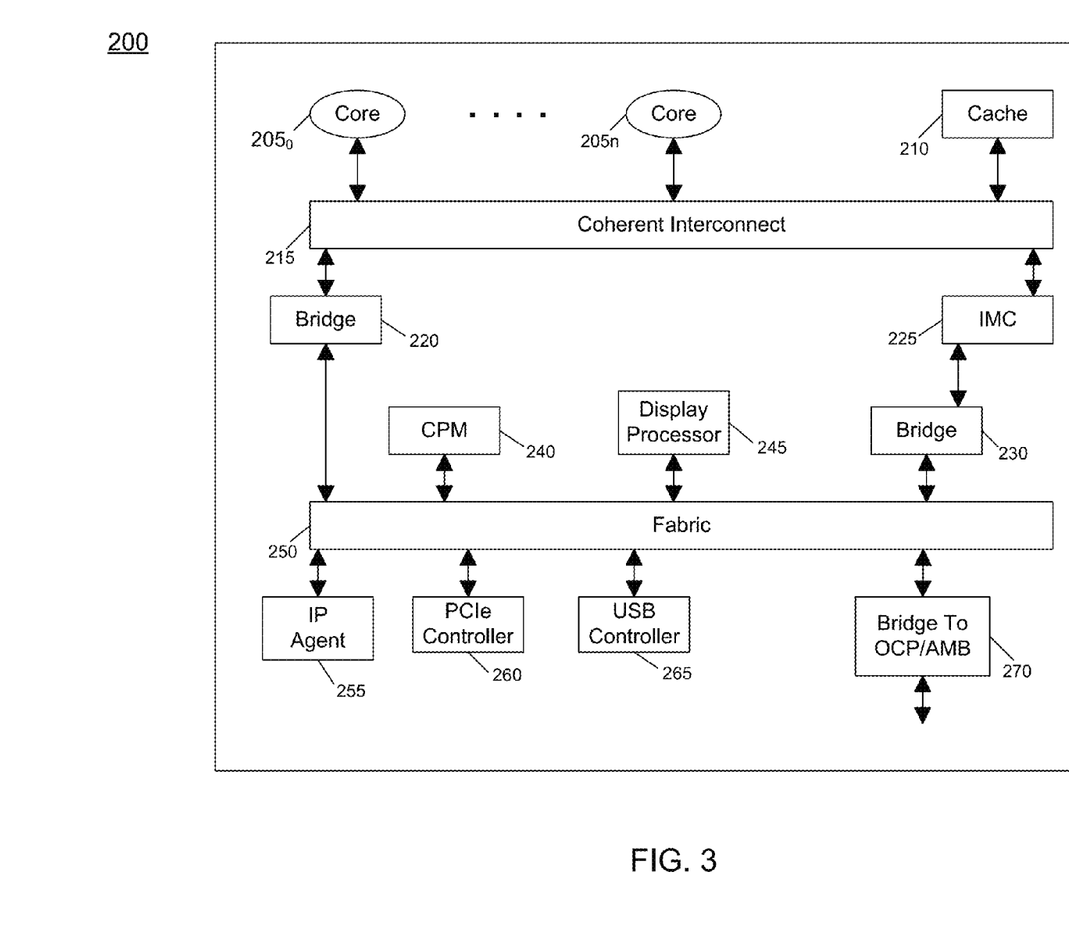
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
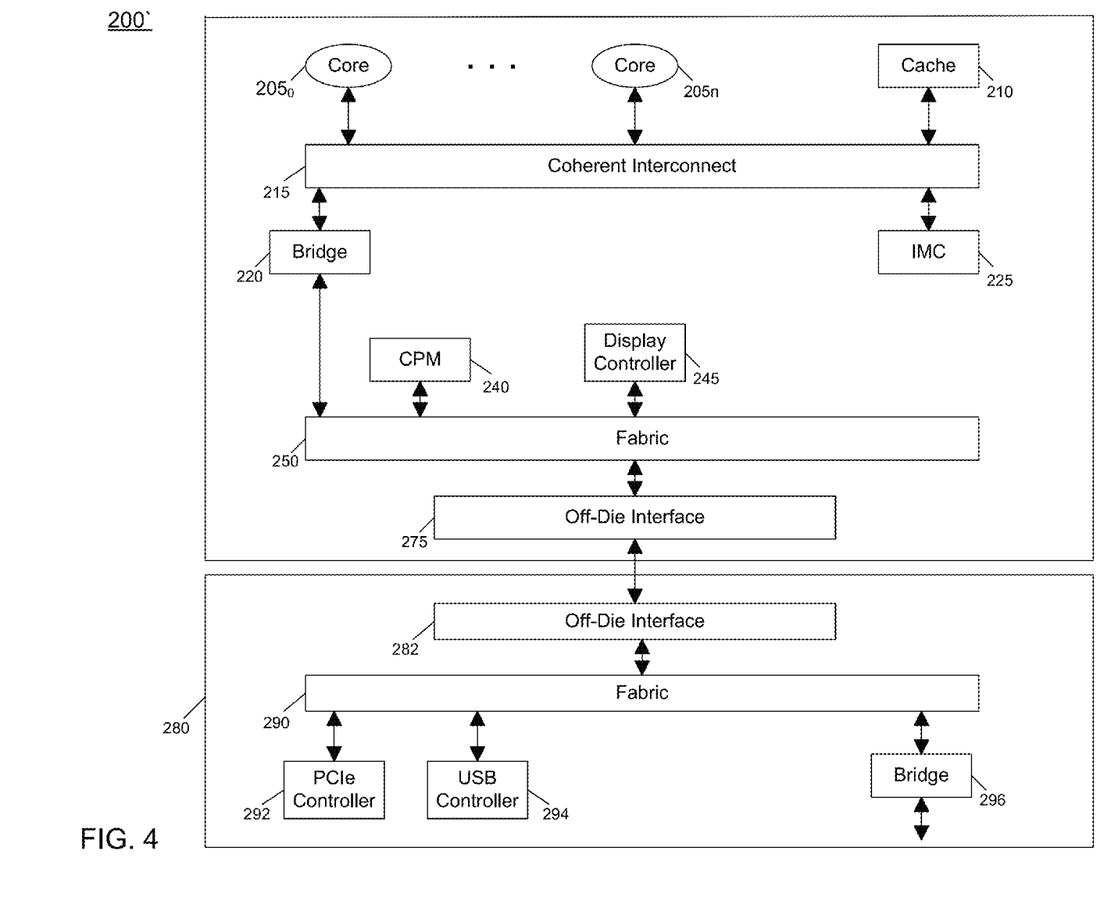
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

In a grant-based fixed priority arbiter (GFPA) scheme, grant counts are used to allocate bandwidth for each of different requestors when a resource such as link coupled between multiple agents (e.g., a shared bus or other interconnect) is over-subscribed. All grant counters are loaded with default values upon reset de-assertion. Each grant issued to a given requestor causes an update to the corresponding requestor's grant counter, e.g., a decrement of 1. Eventually, grant counts will be reloaded globally when no active request is pending or all active requests have consumed their respective grant counts, or by a combination of both conditions, thus triggering a new round of arbitration. In a GFPA scheme, evaluation of whether to perform a global grant count reload can occur every clock cycle.

Certain requestors are incapable of sustaining back-to-back request assertions. In other words, these requestors cannot issue pipelined requests (e.g., in a first clock cycle and a next cycle). This may be due to request credit exchange roundtrip delay for agents with limited request queue depth without incurring additional gate count, or a device internal back-to-back request bubble, where a request signal is de-asserted when it is granted by the arbiter. To prevent a global grant count reload from being triggered unintentionally when back-to-back request assertion is not sustainable by a given agent, embodiments can delay reload of grant counts. In this way, a grant count reload operation can be delayed when a non-pipelined requestor's grant counter (or more than one such requestors' grant counters) has not consumed all its grant counts for a given arbitration round. In this way, bandwidth can be allocated to the non-pipelined requestor(s) per the bandwidth ratio defined by the assigned grant counts. That is, grant counter reload can be delayed when no requests are pending and the grant counter associated with at least one of the agents has a non-zero value.

In various embodiments, a global hysteresis counter may be provided in a GFPA to resolve the bandwidth allocation issue due to a request bubble (e.g., of 1-5 clocks) of non-pipelined requestors. Effectively, the global grant count reload in GFPA is delayed by the hysteresis counter until 'accurate' information from requestors is observed. This delay thus prevents grant counter reload for a predetermined number of clock cycles after a non-pipelined requestor has a request de-asserted (when at least one of the requestors has available grants for the arbitration round).

Upon de-assertion of any non-pipelined request, the hysteresis counter can be loaded with a configurable value (which in various embodiments may be set to greater than or equal to a number of clocks of a request bubble, e.g., of a requestor having a largest request bubble). The counter may be updated each clock cycle (e.g., it can be self-decremented by one per clock cycle until it reaches zero). And the global grant count reload is allowed to occur only when the next state of the hysteresis counter is zero. This state is equivalent to the present state (or current value) being one, with a decrement term asserted; or a present state of zero, with a reload term de-asserted. In other words, the next state of the hysteresis counter is the counter's flops input, or the value of the counter in the next clock.

In order to minimize the unnecessary effect of this hysteresis period (where the next state of hysteresis counter is larger than zero), the operation of this hysteresis period may further be qualified such that the de-asserting non-pipelined request is for a requestor having a corresponding grant counter having a non-zero value, since requestors that have consumed the last grant count do not need the hysteresis effect. Also when grant counts for all non-pipelined requestors are zero, the hysteresis effect may be eliminated by resetting the hysteresis counter to zero.

In one embodiment, the priority of hysteresis counter operation, per cycle of an arbitration round, may be as follows: i. (first priority) reset to zero when grant counts of all non-pipelined requests are zero; ii. (second priority) load with hysteresis value when there is a de-assertion of any non-pipelined request with a non-zero grant count; and iii. (third priority) decrement by 1 when the counter is larger than zero.

Thus according to various embodiments, a GFPA scheme may be able to maintain bandwidth allocation per a defined ratio despite of the existence of non-pipelined requestors. By knowing a priori the clock number of request bubbles of all non-pipelined requestors, the hysteresis value can be configured to adapt to different clock numbers of request bubble in different platforms without register transfer level (RTL) changes.

Furthermore, a GFPA scheme with a hysteresis counter in accordance with an embodiment of the present invention may handle non-pipelined requestors with different clock numbers of request bubbles, provided the hysteresis value is equal to or larger than the longest number of request bubbles of the non-pipelined requestors in the platform.

In addition, the hysteresis counter that delays a global grant count reload in an arbiter does not introduce additional gate levels to the request grant path, which maintains a timing critical path. The effect of the hysteresis period can be handled carefully, where a new hysteresis period is triggered by de-assertion of any non-pipelined request with a non-zero grant count. When all non-pipelined requestors' grant counts are zero, the hysteresis effect can be eliminated immediately by resetting the hysteresis counter to zero.

Figure 5:
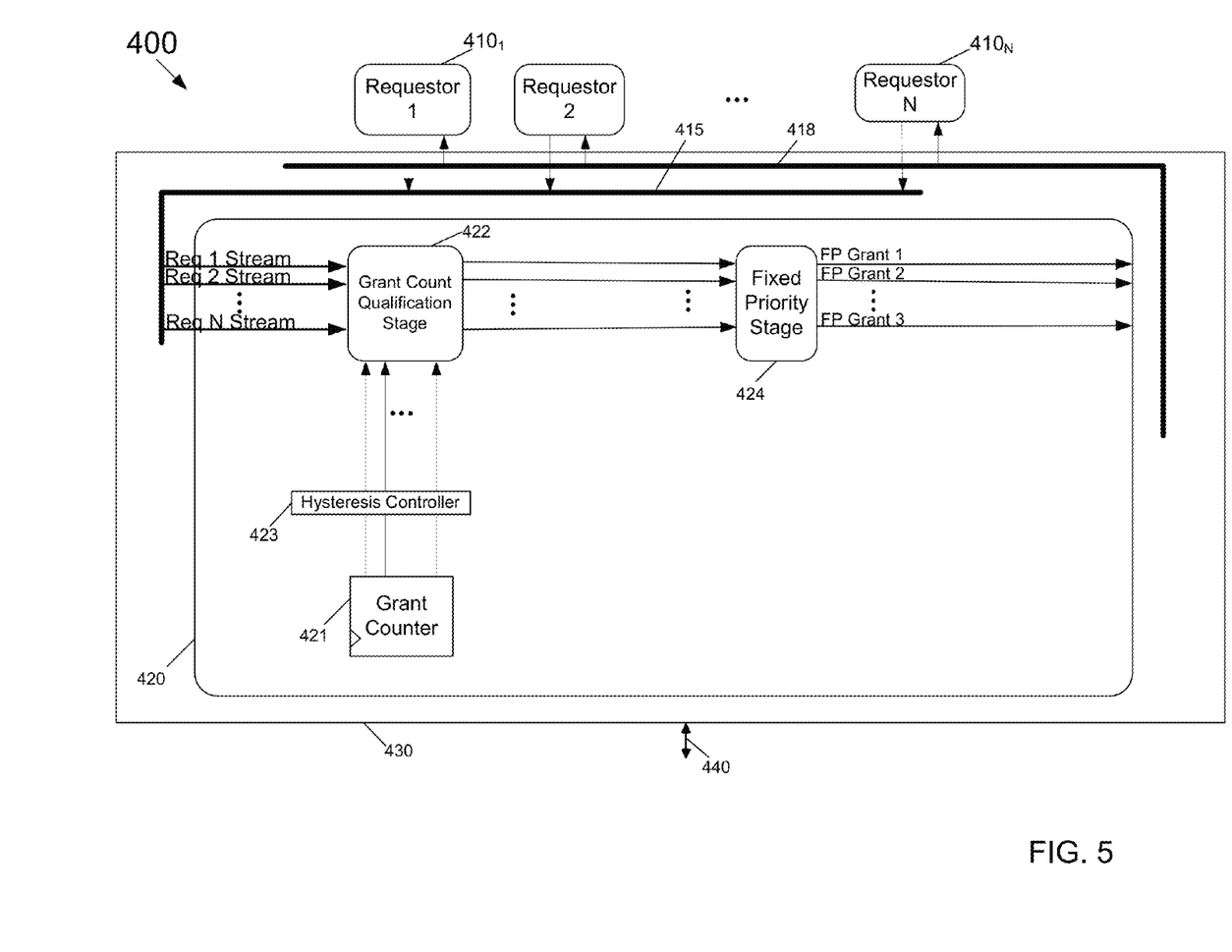
FIG. 5 is a block diagram of an arbitration system in accordance with an embodiment of the present invention.

Referring now to FIG. 5, shown is a block diagram of an arbitration system in accordance with an embodiment of the present invention. As shown in FIG. 5, system 400 includes a plurality of requestors $410_1$-$410_n$ (generically requestor 410). Each requestor 410 is coupled to an arbiter 420 by way of a first interconnect 415 and a second interconnect 418 to provide requests to arbiter 420 and receive grants therefrom. In the embodiment of FIG. 5, arbiter 420 may be of a fabric 430 that in turn is connected via an interconnect 440 such as an upstream channel to another component such as an upstream component, e.g., a chipset or other interface logic.

In various embodiments, arbiter 420 may be a fixed priority grant count arbiter to provide one or more grants to each of requestors 410 during an arbitration round or cycle. As shown in FIG. 5, arbiter 420 may include a fixed priority portion that includes a grant count qualification stage 422 and a fixed priority stage 424. Note that a grant counter 421 is coupled to grant count qualification stage 422 to provide grant counts for each of the given requestors 410, via a hysteresis controller 423, which controls grant count reloads in accordance with an embodiment of the present invention. In operation, incoming request streams to grant count qualification stage 422 are processed and provided to fixed priority stage 424 which thus grants fixed priority grants. While shown with this particular implementation in the embodiment of FIG. 5, the scope of the present invention is not limited in this regard. For example, in other embodiments in addition to a fixed priority portion, an arbiter may further include an opportunistic grant mechanism to thus provide additional grants beyond an allocated bandwidth when available cycles are present in an arbitration round.

Figure 6:
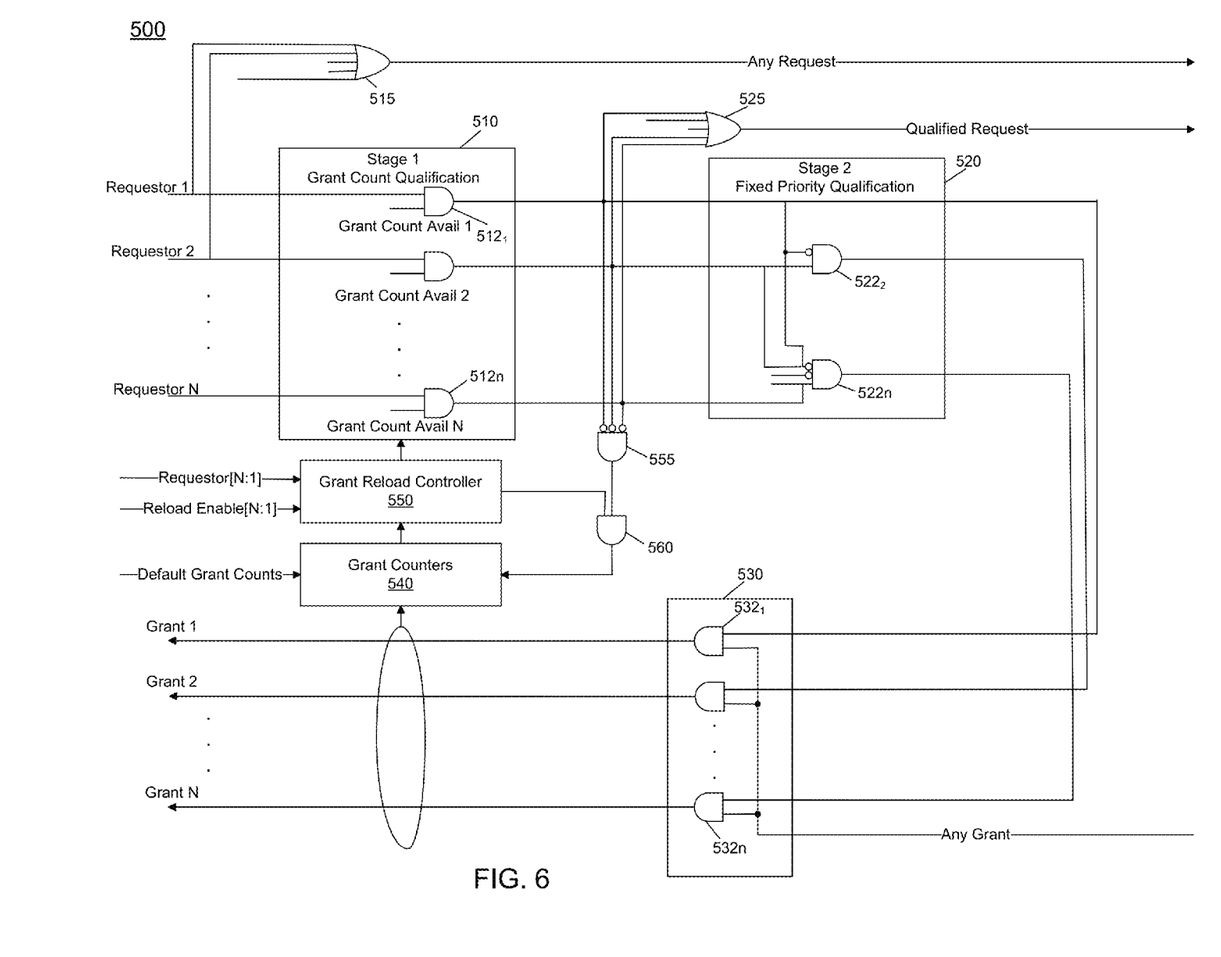
FIG. 6 is a block diagram of an arbiter in accordance with one embodiment of the present invention.

Referring now to FIG. 6, shown is a block diagram of further details of an arbiter in accordance with an embodiment of the present invention. As shown in FIG. 6, arbiter 500 may be a fixed priority arbiter, and more specifically, arbiter 500 may include a grant count qualification stage 510 and a fixed priority qualification stage 520, such as discussed above with regard to FIG. 5. Further details of these stages, along with further components of the arbiter are shown. Specifically, as seen grant count qualification stage 510 may include various logic, namely a plurality of logic gates, e.g., AND gates $512_1$-$512_n$, each associated with incoming requests from a corresponding requestor. In addition, each gate further receives a grant count available signal for the corresponding requestor. In the embodiment of FIG. 5, these grant count available signals may be received from a grant reload controller 550, discussed further below. Thus grant count qualification stage 510 operates to output an active, asserted signal for a corresponding request from a requestor when a valid asserted request signal is received and an available grant count is present for the corresponding requestor. These grant qualification signals may be provided to priority qualification stage 520 which can be implemented also as a plurality of logic gates, namely AND gates $522_2$-$522_n$. As seen, each gate may have a single input that is non-inverted, namely the grant qualification signal from the corresponding output of grant count qualification state 510. All other inputs to the logic gate, however are inverted. In this way, only a single output from priority qualification stage 520 is active at a time. And furthermore these outputs may be based on priority such that when a request is asserted for a highest priority requestor, e.g. requestor 1 in the embodiment of FIG. 6, that request is the active one (as it has no logic to gate it), and so forth. Accordingly, for a given arbitration round so long as requestor 1 has available grants in its corresponding grant counter, its requests will be granted, and so forth from requestor 2 to requestor N (with requestor N being the lowest priority requestor).

Still referring to FIG. 6, the corresponding priority grant signals, only one of which is active, may be provided to a grant signal stage 530, where each of the signals can be provided to a corresponding logic, namely corresponding AND gate $532_1$-$532_n$, in which the signal is combined with a global grant signal such that the corresponding grant is issued if this grant global grant signal is active. Accordingly, the asserted grant signal may be provided back to the requestor to enable transmission of its transaction corresponding to the request to, e.g. an upstream channel coupled to the requestors, another agent, a fabric or other such destination location.

Still referring to FIG. 6, the active grant signal that is issued may be used to update a corresponding one of a plurality of grant counters. As seen, grant counters 540 (generally) may receive a default number of grant counts during each arbitration cycle, namely at global grant count reload. In accordance with various embodiments, this reloading may be controlled by grant reload controller 550, which qualifies the reload to only occur upon the realization of certain preconditions. To this end, note that a grant reload operation is enabled by a reset signal output from a logic gate 560, which in turn is coupled to receive an input from a second logic gate 555 and the output of grant reload controller 550. Second logic gate 555 may, as shown, receive the grant qualified signals from each of the requestors at an inverted input, such that the output of the logic gate is active only when no active qualified outputs are provided from grant count qualification stage 510. In turn, the control signal from grant reload controller 550 may be active to thus allow the reset to occur only when these certain preconditions, as discussed above have been met. As seen, grant reload controller 550 may further receive a default hysteresis value, which may be controlled by a value stored, e.g. in a configuration register. As an example of this configuration, a field of a configuration register can be used to provide a programmable hysteresis value, which may be loaded upon de-assertion of a request, when enabled by a corresponding enable bit in a configuration register (the same or different register). Note that when disabled, upon request de-assertion, a global grant count reload occurs when at least one non-pipelined requestor does not have an active request (regardless of grant counts). Although shown with this particular implementation in the embodiment of FIG. 6, understand the scope of the present invention is not so limited.

Figure 7:
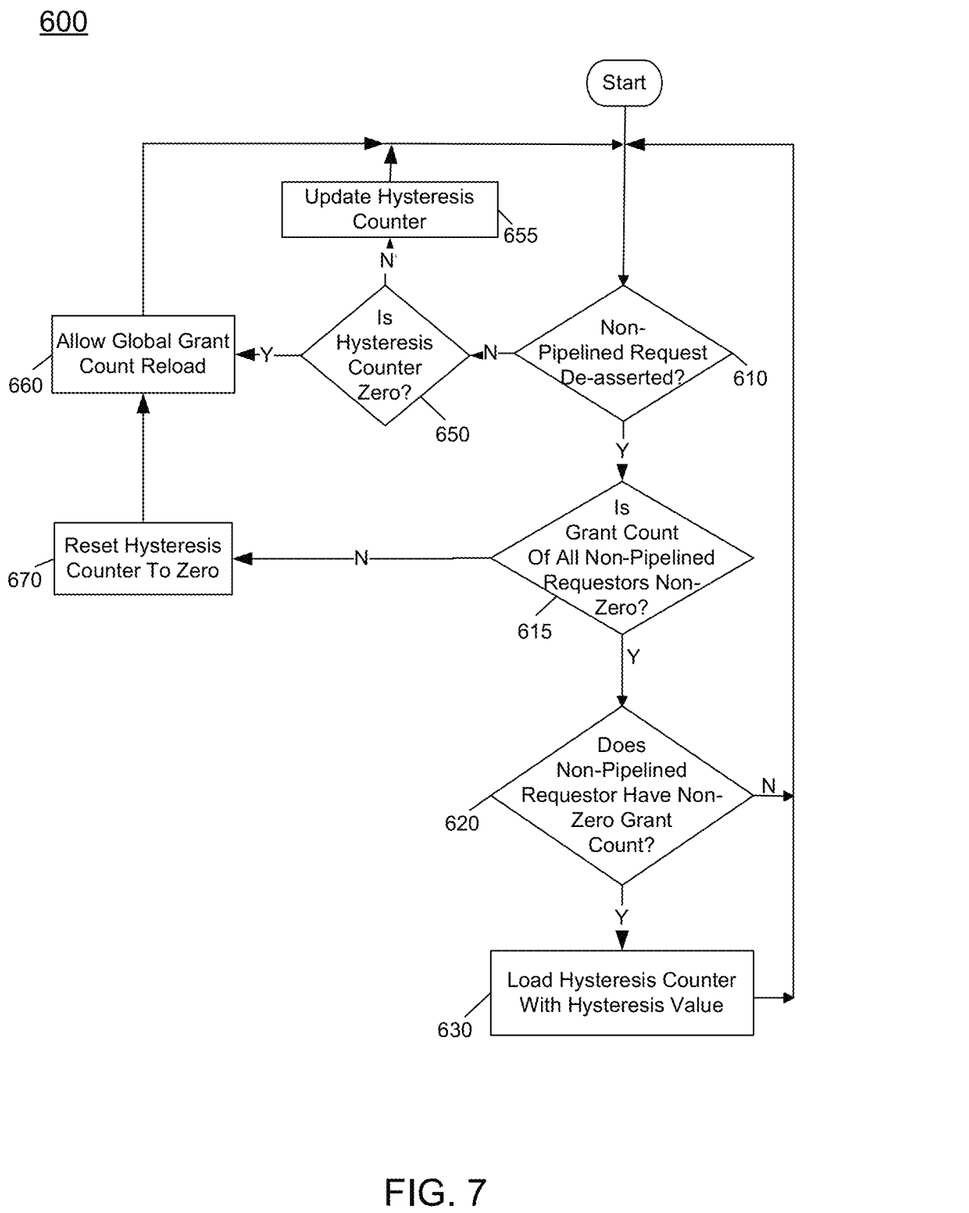
FIG. 7 is a flow diagram of a method in accordance with one embodiment of the present invention.

In various embodiments, grant reload controller 550 may include logic to perform control of a grant reload operation such as shown in the flow diagram of FIG. 7. To this end, the controller may include or be coupled to a non-transitory storage medium that includes instructions to perform the method shown in FIG. 7. As seen in FIG. 7 method 600 may begin by determining whether a non-pipelined request has been de-asserted, meaning that this request has been granted (diamond 610). If so, control passes to diamond 615 where it can further be determined whether all non-pipelined requestors have a non-zero grant count value. If so, control passes to diamond 620, where it can further be determined whether the corresponding non-pipelined requester has a non-zero grant count. If so, control passes to block 630, where the hysteresis counter can be loaded with the hysteresis value which, as discussed above, can be obtained from a configuration register. As seen, control passes next again to diamond 610.

If instead at diamond 610 it is determined that a non-pipelined request has not been de-asserted, control passes to diamond 650. There, it can be determined whether the hysteresis counter is at a zero value. If so, control passes to block 660 where the global grant count reload may be allowed. If instead at diamond 650 it is determined that the hysteresis counter value is non-zero, control rather passes to block 655, where the hysteresis counter may be updated. For example, for this given clock cycle, the value of the hysteresis counter can be decremented, e.g., by one.

Note that at diamond 615 if it is determined that the grant counters of non-pipelined requesters are all at zero, control passes to block 670, where the hysteresis counter, e.g., present in the grant reload controller, is reset to a zero value. This reset to zero value may thus allow the global grant count reload to occur (block 660). More specifically with reference back to FIG. 6, by resetting the hysteresis counter to a zero value, the reload control signal may be issued from grant reload controller 550. Note that although shown with this particular order in the embodiment of FIG. 7, understand embodiments are not so limited, and the operation set forth can occur in different orders in other implementations.

Embodiments may be implemented in different components such as a platform controller hub (PCH) used in desktop, mobile and server platforms. The hysteresis counter with a configurable hysteresis count enables a fabric to adapt to platforms having non-pipelined I/O interfaces with different clock numbers of request bubbles while maintaining bandwidth allocation per the assigned grant counts. In this way, a chipset or other component can deliver expected bandwidth allocation per I/O interfaces under an over-subscribed condition.

Figure 8:
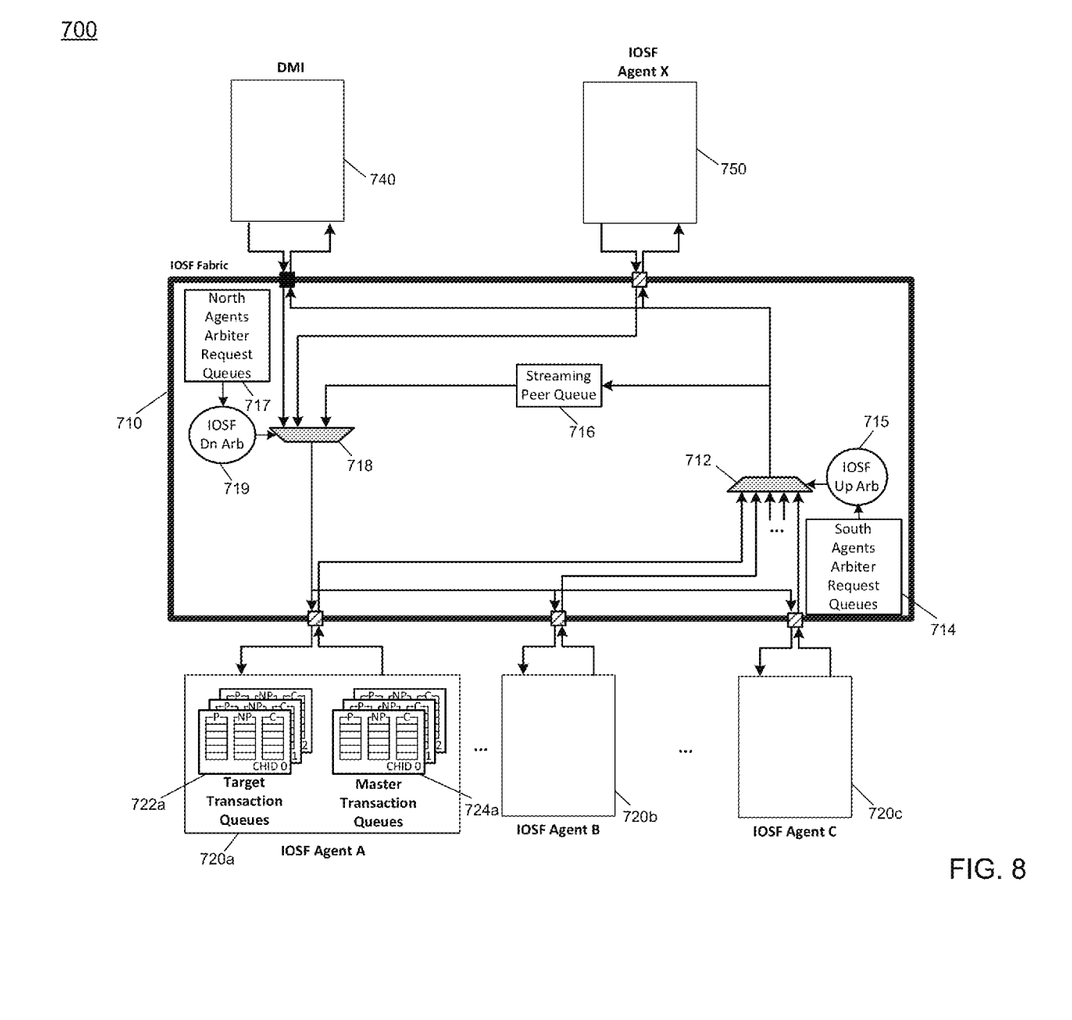
FIG. 8 is a block diagram of a portion of a system in accordance with an embodiment of the present invention.

Referring now to FIG. 8, shown is a block diagram of a portion of a system in accordance with an embodiment of the present invention. As shown in FIG. 8, system 700 includes a fabric 710 that is coupled between various upstream resources, namely a direct media interface (DMI) 740 and an agent 750 which in various embodiments may be a processor core, peripheral device or so forth. As further seen, fabric 710 further couples to a plurality of downstream agents, namely agents 720a-720c. Although shown with only these 3 agents in the embodiment of FIG. 8, understand the scope of the present invention is not limited in this regard. In general, each agent may include a target interface and a master interface. As shown in agent 720a, the agents may include a plurality of target transaction queues 722 and a plurality of master transaction queues 724. Requests from these agents are provided to a set of request queues 714 in fabric 710, which in turn are coupled to an arbiter 715 which may be an arbiter in accordance with an embodiment of the present invention to select a given request for fulfilling. As seen, to provide a request upstream via a multiplexer 712, arbiter 714 provides a control signal to control the multiplexer. Transactions thus may be provided to the upstream agents 740 and 750 and further to a streaming peer queue 716. As seen, in a downstream direction, incoming transactions may be provided to a multiplexer 718 that is controlled by a downstream arbiter 719, which receives corresponding requests from a set of request queues 717. Although shown at this high level in the embodiment of FIG. 8, understand the scope of the present invention is not limited in this regard.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first arbiter to grant requests from a plurality of requestors according to a fixed priority protocol in which each of the plurality of requestors is granted a predetermined number of grants per arbitration cycle; and
a grant reload controller coupled to the first arbiter to prevent a reload of a plurality of grant counters of the first arbiter for a predetermined number of clock cycles after a non-pipelined requestor of the plurality of requestors has a request de-asserted.

2. The apparatus of claim 1, wherein the grant reload controller is to enable at least one non-pipelined requestor to receive an allocated bandwidth ratio per arbitration cycle.

3. The apparatus of claim 1, wherein the grant reload controller includes a hysteresis counter having a value corresponding to the predetermined number of clock cycles set according to a configuration register.

4. The apparatus of claim 3, wherein the hysteresis counter is to be reset if non-pipelined requestors of the plurality of requestors each has no grants available for a remaining portion of the arbitration cycle.

5. The apparatus of claim 4, wherein the grant reload controller is to reload the plurality of grant counters responsive to the reset hysteresis counter.

6. The apparatus of claim 3, wherein the grant reload controller is to update the value of the hysteresis counter each clock cycle.

7. The apparatus of claim 3, wherein the grant reload controller is to reload the hysteresis counter with the value corresponding to the predetermined number of clock cycles responsive to a non-pipelined requestor having a de-asserted request and an associated grant counter having a non-zero value.

8. The apparatus of claim 1, wherein the first arbiter comprises a fixed priority arbiter.

9. A method comprising:
receiving requests from a plurality of requestors in an arbiter that is to provide access to at least one resource;
detecting that none of the plurality of requestors have a qualified request for at least one cycle of an arbitration round; and
preventing, in presence of the detection, a grant count reload of a plurality of grant counters each associated with one of the plurality of requestors for a predetermined number of clock cycles when at least one of the requestors has available grants for the arbitration round, wherein the predetermined number of clock cycles corresponds to a request bubble delay of one of the plurality of requestors.

10. The method of claim 9, wherein the one of the plurality of requestors has a largest request bubble delay of the plurality of requestors.

11. The method of claim 9, further comprising terminating preventing the grant count reload and reloading the grant counters for each of the plurality of requestors when none of the grant counts have a non-zero value.

12. A system comprising:
a first plurality of agents each corresponding to an intellectual property (IP) block; and
a fabric coupled to the first plurality of agents, the fabric including an arbiter to grant access by the first plurality of agents to a resource coupled to the fabric according to a fixed priority protocol in which each of the first plurality of agents is granted a predetermined number of grants per arbitration round, the fabric including a controller to delay a reload of a plurality of grant counters each associated with one of the first plurality of agents when no requests are pending and the grant counter associated with at least one of the first plurality of agents has a non-zero value, the controller including a hysteresis counter having a value corresponding to a request bubble delay of one of the first plurality of agents.

13. The system of claim 12, wherein the controller is to enable the at least one of the first plurality of agents that is a non-pipelined requestor to receive an allocated bandwidth ratio per arbitration round.

14. The system of claim 12, wherein the hysteresis counter is to be reset if non-pipelined requestors of the first plurality of agents each has no grants available for a remaining portion of the arbitration round.

15. The system of claim 14, wherein the controller is to reload the plurality of grant counters responsive to the reset hysteresis counter.

16. The system of claim 12, wherein the controller is to update the value of the hysteresis counter per clock cycle.

17. The system of claim 12, wherein the controller is to reload the hysteresis counter with the value responsive to a non-pipelined requestor of the first plurality of agents having a de-asserted request and an associated grant counter having a non-zero value.

\* \* \* \* \*